July 25, 1961 R. B. MISKIN 2,993,284
EARTH SCRAPERS
Filed May 7, 1959 2 Sheets-Sheet 2
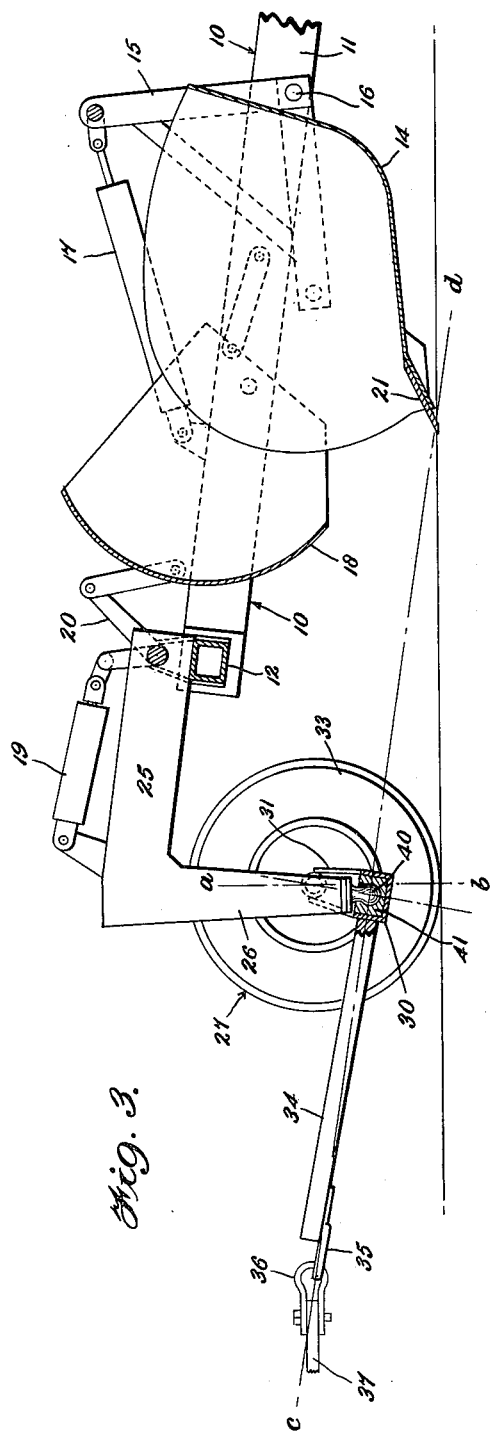
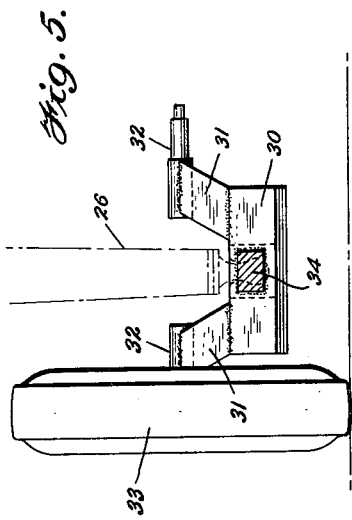
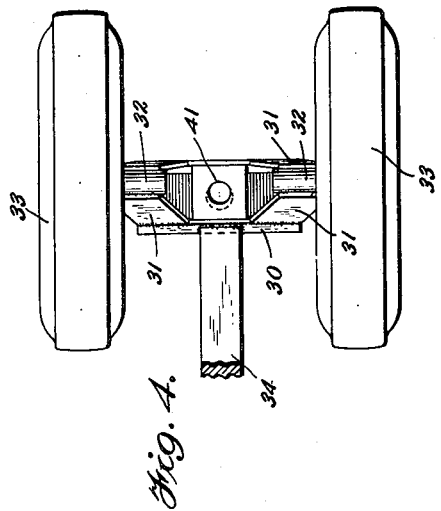
INVENTOR
Richard B. Miskin,
BY
ATTORNEY United States Patent Office 2,993,284
Patented July 25, 1961

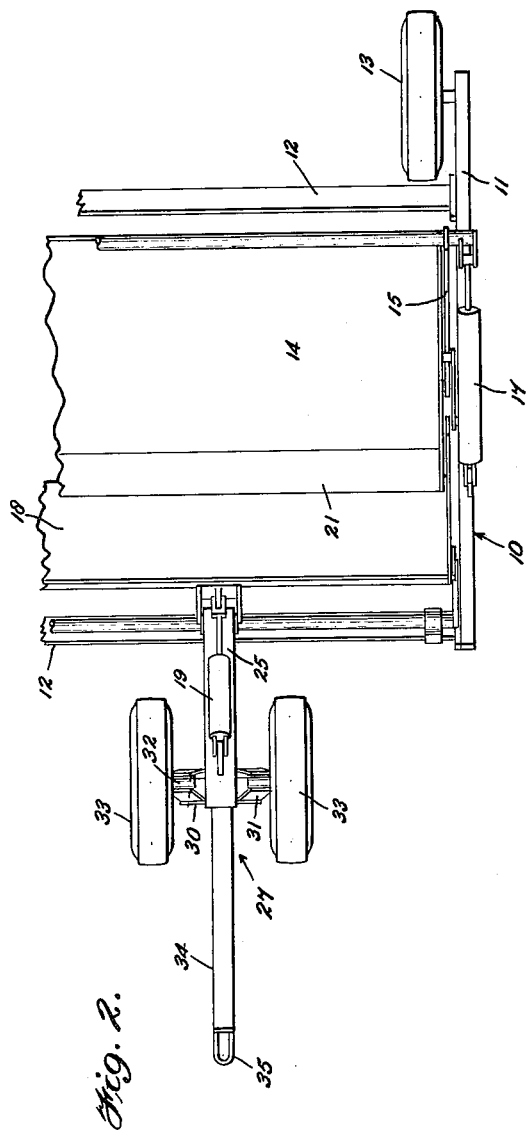
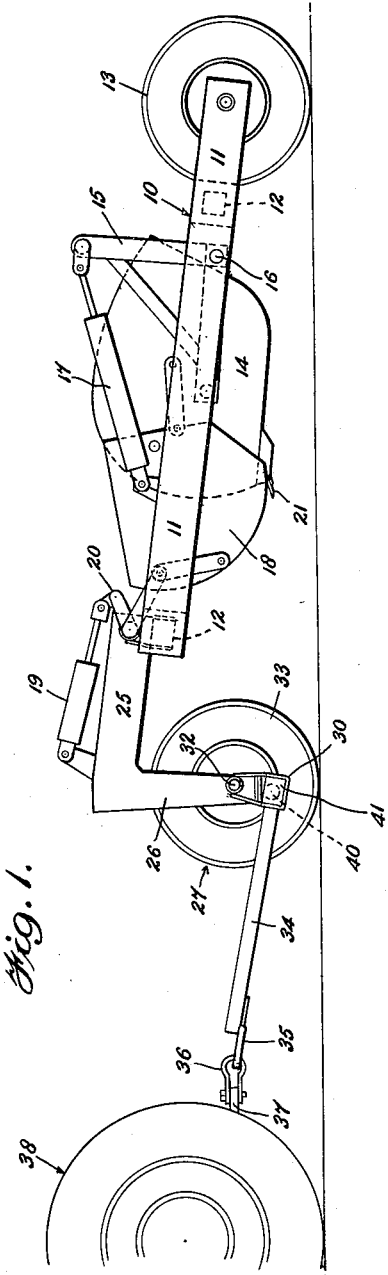

2,993,284
EARTH SCRAPERS
Richard B. Miskin, Ucon, Idaho, assignor to Miskin Scraper Works, Inc., Ucon, Idaho, a corporation of Idaho
Filed May 7, 1959, Ser. No. 811,589
2 Claims. (Cl. 37—126)

This invention relates to wheeled earth scrapers which commonly are connected to and drawn by a tractor or similar powered vehicle, and it pertains more especially to the type of scraper wherein a wheeled dolly supports the forward end of the scraper proper and provides the actual draft transmitting connection between it and the tractive vehicle. The invention has for its principal object the provision of an improved structure and arrangement whereby the tractive effort of the tractor may be enhanced while at the same time uneven cutting or scraping action by the scraper, due to lifting or bouncing of the dolly, may be substantially prevented, all with an appreciable increase in the efficiency of the machine.

With the above and other objects in view which will appear as the description proceeds, the invention resides in the novel details of construction and the novel combinations and arrangements of parts more fully hereinafter disclosed and particularly pointed out in the appended claims.

In the accompanying drawings constituting a part of this specification, in which like reference characters designate like parts throughout the views:

FIGURE 1 is a side elevational view of a dolly-equipped earth scraper constructed and arranged in accordance with the invention, with the near dolly wheel omitted for the sake of clearness, and the earth receptacle and its associated parts being illustrated in their normal or transporting positions;

FIG. 2 is a partial plan view of the parts shown in FIG. 1;

FIG. 3 is a longitudinal sectional view of the scraper and dolly, on a somewhat larger scale, with the scraper elements being illustrated in their scraping positions;

FIG. 4 is a plan view of the dolly per se; and

FIG. 5 is a front elevational view thereof, as seen from the left of FIG. 1.

The structural details of the scraper itself are not here important except to the extent that they include a frame having an earth receptacle mounted thereon for movement to and from a ground-engaging and scraping position. In the exemplary form here shown the scraper comprises an open rectangular frame 10 which includes longitudinal side members 11 and transverse members 12, each of the former of which is provided with a supporting wheel 13 adjacent its rearward end. A scoop or earth receptacle 14 is disposed within said frame forwardly of the wheels 13, such receptacle being carried by bell-crank members 15 which are pivotally mounted on the side frame members 11 at 16. Hydraulic rams 17, anchored on said frame members, are connected to said bell-cranks 15 whereby to effect swinging movements of the latter, with resultant movements of the receptacle 14 between the elevated earth-carrying position shown in FIG. 1 and the lowered ground-engaging and scraping position shown in FIG. 3. The receptacle is provided with a swingable gate 18 arranged to close the open forward side thereof when in the earth-carrying position of FIG. 1, said gate however, being movable by a hydraulic ram 19 and linkage 20 to the elevated position shown in FIG. 3 during the filling and the dumping of the receptacle.

Although differing somewhat in detail, the construction thus far described is in general similar to that disclosed in prior U.S. Patent No. 2,514,782 granted July 11, 1950, to Merlin R. Miskin. In the present machine however, the forward end of the scraper frame 10 is provided with a goose-neck element 25, the lower end of the vertical pillar 26 of which rests upon and is universally-pivotally connected to a wheeled dolly 27, which thus supports the front end of the scraper.

The said dolly 27 comprises a drop- or cranked-axle structure here shown as composed of a horizontal channel bar 30 each end portion of which is provided with a pair of upwardly extending ears 31 the upper ends of which are welded or otherwise rigidly secured to the transversely spaced, axially alined horizontal spindles 32 upon each of which is mounted a ground-engaging wheel 33. The channel member 30 thus occupys a position between said dolly wheels, and substantially lower than the plane of their axis. A draft tongue 34 is rigidly secured to and extends forwardly from said channel member, which tongue is provided at its forward end with an eye 35 arranged for ready attachment to the clevis or other coupling member 36 carried by the draft-bar 37 of a tractor or similar powered vehicle 38.

The above mentioned universal pivotal connection between the dolly 27 and the vertical pillar 26 of the scraper goose-neck may be of any appropriate construction, that here shown being of the ball-and-socket type comprising a ball element 40 secured to and depending from the said goose-neck pillar, which ball is seated in and co-operates with a socket member 41 that is rigidly carried by the medial portion of the axle channel member 30.

As will be readily understood from FIGS. 1 and 3, this location of the connection between the scraper and the dolly on the dropped horizontal member 30 of the axle structure disposes such connection in a plane substantially lower than that of the tractor draw-bar 37 and its coupling 36, 35 with the dolly tongue 34, with the result that the resistance imposed by the scraper to the horizontal pull exerted by the tractor draw-bar 37 is not transmitted to said draw-bar in a horizontal direction, as would be the case if the universal connection 40, 41 were located in the plane of the draw-bar. Instead, such resistance is exerted in an inclined direction, i.e., from the lower universal connection 40, 41 to the higher tractor draw-bar, with a resulting downward force component on the draw-bar which tends to press the tractor wheels more firmly on the ground and reduce slippage thereof, with consequent enhancement of their tractive effort.

This desirable result may be still further improved if, as shown in FIG. 3, the universal connection 40, 41 between the scraper and dolly be located somewhat forwardly of the vertical plane of the axis of the dolly wheels 33 (indicated by the line a—b), whereby the front end of the scraper exerts a direct downward force on the axle structure eccentrically of its wheel axis which tends to turn said structure counterclockwise about said axis (as viewed in FIG. 3) and thus impose additional downward force on the tractor draw-bar through the tongue 34.

The location of the universal connection 40, 41 preferably should not be substantially lower than the plane extending from the tractor-dolly coupling 35, 36 to the line of resistance imposed by the engagement of the scraper blade 21 with the ground when the scoop 14 is in its lowered, scraping position, which plane is indicated by the line c—d in FIG. 3. Should the said connection be disposed substantially below this plane the tractor pull will tend to raise it to a point in a direct line extending from the point of application of the tractor pull to the dolly to the line of blade resistance, thereby lifting the dolly from the ground and raising the front end of the scraper, with resultant uneven cutting by the scraper blade and delay in the filling of the receptacle. Thus, the optimum location of the tractor-dolly connection 40, 41 should be in or adjacent the plane c—d.

While one form of the invention has been illustrated and described for purposes of disclosure, it is obvious that those skilled in the art may vary the precise details of construction and arrangements of parts without departing from the spirit of the invention, and therefore it is not wished to be limited to the above description except as may be required by the appended claims.

What is claimed is:

1. In earth working apparatus, the combination with a powered tractor which has a draft-transmitting coupling member disposed at a substantial distance above the ground surface, of a scraper comprising a frame provided with supporting wheels adjacent its rearward end; an earth receptacle mounted on said frame forwardly of said wheels and arranged to be moved to and from a ground-engaging and scraping position; and a wheeled dolly provided with a draft tongue detachably connected to said tractor coupling member, said dolly having a pivotal connection with the scraper frame forwardly of the earth receptacle whereby to support the forward end of the frame, such pivotal connection being disposed below and forwardly of the rotative axis of the dolly wheels and in substantially a direct line between the dolly tongue-tractor coupling connection and the line of contact of the earth receptacle with the ground when said receptacle is in its scraping position.

2. In earth working apparatus, the combination with a powered tractor which has a draft-transmitting coupling member disposed in substantial spaced relation to the ground surface, of a scraper comprising a frame provided with supporting wheels adjacent its rearward end; an earth receptacle mounted on said frame forwardly of said wheels and arranged to be moved to and from a ground-engaging and scraping position; and a wheeled dolly including an axle structure mounting the dolly wheels, and a draft tongue extending forwardly therefrom and connected to said tractor coupling member, said axle structure having a dropped portion intermediate the dolly wheels which portion is provided with a universal pivotal connection with the forward portion of the scraper frame whereby to support the same, such connection being disposed forwardly of the rotative axis of the dolly wheels and in approximately a direct line between the point of application of tractor pull to the dolly tongue and the line of resistance imposed by the engagement of the scraping portion of the earth receptacle with the ground when said receptacle is in its scraping position.

References Cited in the file of this patent

UNITED STATES PATENTS

| | | |
|---|---|---|
| 1,290,813 | Weaver | Jan. 7, 1919 |
| 1,481,376 | Klein | Jan. 22, 1924 |
| 2,271,790 | Allin | Feb. 3, 1942 |
| 2,354,250 | Evans | July 25, 1944 |